(12) United States Patent
Matsuie et al.

(10) Patent No.: US 10,130,910 B2
(45) Date of Patent: Nov. 20, 2018

(54) COMPRESSED AIR DRYING DEVICE (71) Applicant: NABTESCO AUTOMOTIVE CORPORATION, Tokyo (JP)

(72) Inventors: Nobushige Matsuie, Tokyo (JP); Ichiro Minato, Tokyo (JP); Tomoya Nishihara, Tokyo (JP); Yusuke Ota, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 26 days.

(21) Appl. No.: 15/110,294

(22) PCT Filed: Jan. 9, 2015

(86) PCT No.: PCT/JP2015/050515
§ 371 (c)(1),
(2) Date: Jul. 7, 2016

(87) PCT Pub. No.: WO2015/105185
PCT Pub. Date: Jul. 16, 2015

(65) Prior Publication Data
US 2016/0325224 A1    Nov. 10, 2016

(30) Foreign Application Priority Data
Jan. 10, 2014 (JP) ................. 2014-003337

(51) Int. Cl.
*B01D 53/02* (2006.01)
*B01D 53/26* (2006.01)
(Continued)

(52) U.S. Cl.
CPC ....... *B01D 53/261* (2013.01); *B01D 53/0415* (2013.01); *B03C 3/011* (2013.01);
(Continued)

(58) Field of Classification Search
CPC .......... B01D 2257/702; B01D 2257/80; B01D 2258/06; B01D 53/0415; B01D 53/261;
(Continued)

(56) References Cited

U.S. PATENT DOCUMENTS

| 3,979,189 A | 9/1976 | Alskog |
| 4,029,486 A * | 6/1977 | Frantz .................... B01D 53/26 55/288 |

(Continued)

FOREIGN PATENT DOCUMENTS

| CN | 2536811 Y | 2/2003 |
| CN | 101500869 A | 8/2009 |

(Continued)

OTHER PUBLICATIONS

International Preliminary Report on Patentability and the Written Opinion of the International Searching Authority as issued in International Patent Application No. PCT/JP2015/050515, dated Jul. 12, 2016.

(Continued)

*Primary Examiner* — Christopher P Jones
(74) *Attorney, Agent, or Firm* — Pillsbury Winthrop Shaw Pittman, LLP (57) ABSTRACT

A compressed air drying device includes a support base including an inlet of compressed air from a compressor, an outlet of the compressed air, and a discharge port of oil and water. The discharge port includes a drain valve device and a drying container. The container is filled with desiccant and is installed in the support base. In a loading operation, the compressed air drying device causes the desiccant to dry the compressed air introduced through the inlet and discharges the dried compressed air through the outlet. In an unloading operation, the compressed air drying device causes the compressed air to pass through the container to discharge oil and water from the discharge port. A glass fiber filter is provided at one or more of a position upstream of the desiccant and a position downstream of the desiccant in a flow of the compressed air during the loading operation.

11 Claims, 9 Drawing Sheets

(51) Int. Cl.
*B03C 3/28* (2006.01)
*F04B 39/16* (2006.01)
*B01D 53/04* (2006.01)
*B03C 3/011* (2006.01)
*B03C 3/019* (2006.01)

(52) U.S. Cl.
CPC ............... *B03C 3/019* (2013.01); *B03C 3/28* (2013.01); *F04B 39/16* (2013.01); *B01D 2257/702* (2013.01); *B01D 2257/80* (2013.01); *B01D 2258/06* (2013.01)

(58) Field of Classification Search
CPC . B03C 3/011; B03C 3/019; B03C 3/28; F04B 39/16
See application file for complete search history.

(56) References Cited

U.S. PATENT DOCUMENTS

| | | | | |
|---|---|---|---|---|
| 4,364,756 | A * | 12/1982 | Clarke | B01D 46/10 210/282 |
| 4,786,298 | A | 11/1988 | Billiet et al. | |
| 5,364,540 | A * | 11/1994 | Sciuto | F25B 43/003 210/266 |
| 5,427,609 | A * | 6/1995 | Zoglman | B01D 53/261 95/105 |
| 2009/0193977 | A1 | 8/2009 | Hilberer | |
| 2010/0206168 | A1 | 8/2010 | Honjo et al. | |

FOREIGN PATENT DOCUMENTS

| | | |
|---|---|---|
| CN | 203002112 U | 6/2013 |
| JP | 50-140965 A | 11/1975 |
| JP | S60-115527 U | 8/1985 |
| JP | S63-043628 U | 3/1988 |
| JP | S63-077511 A | 4/1988 |
| JP | S64-012624 U | 1/1989 |
| JP | H02-066219 U | 5/1990 |
| JP | H08-206437 A | 8/1996 |
| JP | H10-296038 A | 11/1998 |
| JP | 2000-325830 A | 11/2000 |
| JP | 2006-320597 A | 11/2006 |
| JP | 2008-279370 A | 11/2008 |
| JP | 2010-188246 A | 9/2010 |
| JP | 2011-247690 A | 12/2011 |
| JP | 2012-106155 A | 6/2012 |

OTHER PUBLICATIONS

International Search Report as issued in International Patent Application No. PCT/JP2015/050515, dated Feb. 10, 2015.

Office Action as issued in Chinese Patent Application No. 201580003889.1, dated Mar. 28, 2017.

* cited by examiner

Loading Operation

Unloading Operation

Fig.7
Unloading Operation

Fig.8
Unloading Operation

COMPRESSED AIR DRYING DEVICE

CROSS-REFERENCE TO RELATED APPLICATIONS

This application is the U.S. National Stage of PCT/JP2015/050515, filed Jan. 9, 2015, which in turn claims priority to Japanese Patent Application No. JP 2014-003337, filed Jan. 10, 2014. The contents of these applications are incorporated herein by reference in their entireties.

TECHNICAL FIELD

The present invention relates to a compressed air drying device that dries compressed air supplied from a compressor.

BACKGROUND ART

A vehicle such as a truck, a bus, or a construction machine controls systems of a brake, a suspension, and the like using compressed air delivered by a compressor, which is directly connected to an internal combustion engine (hereinafter, an engine). The compressed air contains water contained in the atmospheric air and oil for lubricating the interior of the compressor. If the compressed air containing water and oil enters the systems, rusting and swelling of rubber members (such as O-rings) occur, thus hampering operation of the systems. Therefore, a compressed air drying device, which removes water and oil from compressed air, is arranged downstream of the compressor in an air system.

The compressed air drying device includes a support base, a drying container filled with desiccant, and an exterior case that covers the drying container and is coupled to the support base. The support base includes an inlet through which the compressed air supplied from the compressor is introduced, an outlet through which the dry compressed air is discharged, and a drain discharge port including a draining device (see, for example, Patent Document 1).

When performing a loading operation for removing water, the compressed air drying device causes compressed air, which is introduced through the inlet, to pass through the drying container to discharge the dry compressed air to an external air tank through the outlet while retaining the dry compressed air in the exterior case. When performing an unloading operation for regenerating the desiccant, the compressed air drying device opens a drain valve of the draining device to cause the dry compressed air retained in the exterior case to pass through the drying container in a direction opposite to a direction during the loading operation, thus discharging water through the drain valve. The compressed air drying device repeatedly performs the loading operation and the unloading operation.

The compressed air drying device includes a filter element for removing oil from compressed air in addition to the drying container. The filter element is formed of, e.g., nonwoven fabric.

PRIOR ART DOCUMENT

Patent Document

Patent Document 1: Japanese Laid-Open Patent Publication No. 2012-106155

SUMMARY OF THE INVENTION

Problem that the Invention is to Solve

Conventional filter elements capture only oil particles of which the diameters are relatively large. Thus, more than a little oil remains in the compressed air that has passed through the desiccant and the filter element. It is thus desired that the removal rate of oil from compressed air be increased.

It is an objective of the present invention to provide a compressed air drying device that increases the removal rate of oil from compressed air.

Means for Solving the Problems

Means for achieving the above objectives and advantages thereof will now be described.

To achieve the forgoing objective, a compressed air drying device includes a support base and a drying container. The support base includes an inlet of compressed air from a compressor, an outlet of the compressed air, and a discharge port of oil and water. The discharge port includes a drain valve device. The drying container is filled with desiccant and is installed in the support base. In a loading operation, the compressed air drying device causes the desiccant to dry the compressed air introduced through the inlet and discharges the dried compressed air through the outlet. In an unloading operation, the compressed air drying device causes the compressed air to pass through the drying container to discharge oil and water from the discharge port. A glass fiber filter is provided at one or more of a position upstream of the desiccant and a position downstream of the desiccant in the flow of the compressed air during the loading operation.

In this case, oil particles that are relatively small in particle diameter are captured by arranging the glass fiber filter on at least one of the upstream side and the downstream side of the desiccant. This increases the removal rate of oil from the compressed air, while removing water from the compressed air using the desiccant.

Preferably, the compressed air drying device includes an impingement member, which removes oil by causing oil particles to collide with the impingement member, in a flow path of the compressed air.

In this case, the impingement member, which is located upstream of the glass fiber filter, captures oil particles that are relatively large in particle diameter. The glass fiber filter captures oil particles that are smaller in particle diameter than the oil particles captured using the impingement member. This increases the removal rate of oil of the dry compressed air.

Preferably, the compressed air drying device includes an oil adsorbent material, which captures oil particles by electrostatic force, in the flow path of the compressed air.

In this case, the oil adsorbent material, which is located upstream of the glass fiber filter, captures oil particles that are relatively large in particle diameter. The glass fiber filter captures oil particles that are smaller in particle diameter than the oil particles captured using the impingement member. This increases the removal rate of oil of the dry compressed air.

Preferably, in the compressed air drying device, the glass fiber filter is one of a plurality of glass fiber filters that are arranged upstream and downstream of the desiccant in the flow of the compressed air during the loading operation. The thickness of the glass fiber filter that is arranged upstream is less than the thickness of the glass fiber filter that is arranged downstream.

The water that is removed from the desiccant with the compressed air during the unloading operation is absorbed by the glass fiber filter that is located upstream when passing through the glass fiber filter. However, in this case, the thickness of the glass fiber filter that is located upstream is less than the thickness of the glass fiber filter that is located downstream, and the upstream glass fiber filter easily discharges water. This limits a decrease in the oil capturing efficiency of the glass fiber filter, which occurs by repeating the unloading operation.

Preferably, in the compressed air drying device, the glass fiber filter is arranged downstream of the desiccant in the flow of the compressed air during the loading operation. A filter that has a water absorption rate lower than the glass fiber filter is arranged upstream of the desiccant.

In this case, since the glass fiber filter is arranged only downstream of the desiccant, water removed from the desiccant is not absorbed during the unloading operation. In addition, the filter that has a water absorption rate lower than the glass fiber filter is arranged upstream of the desiccant. Thus, even if the filter absorbs water removed from the desiccant, absorbed water is easily discharged from the filter.

Effects of the Invention

According to the present invention, the removal rate of oil from compressed air is increased.

MODES FOR CARRYING OUT THE INVENTION

First Embodiment

Figure 1:
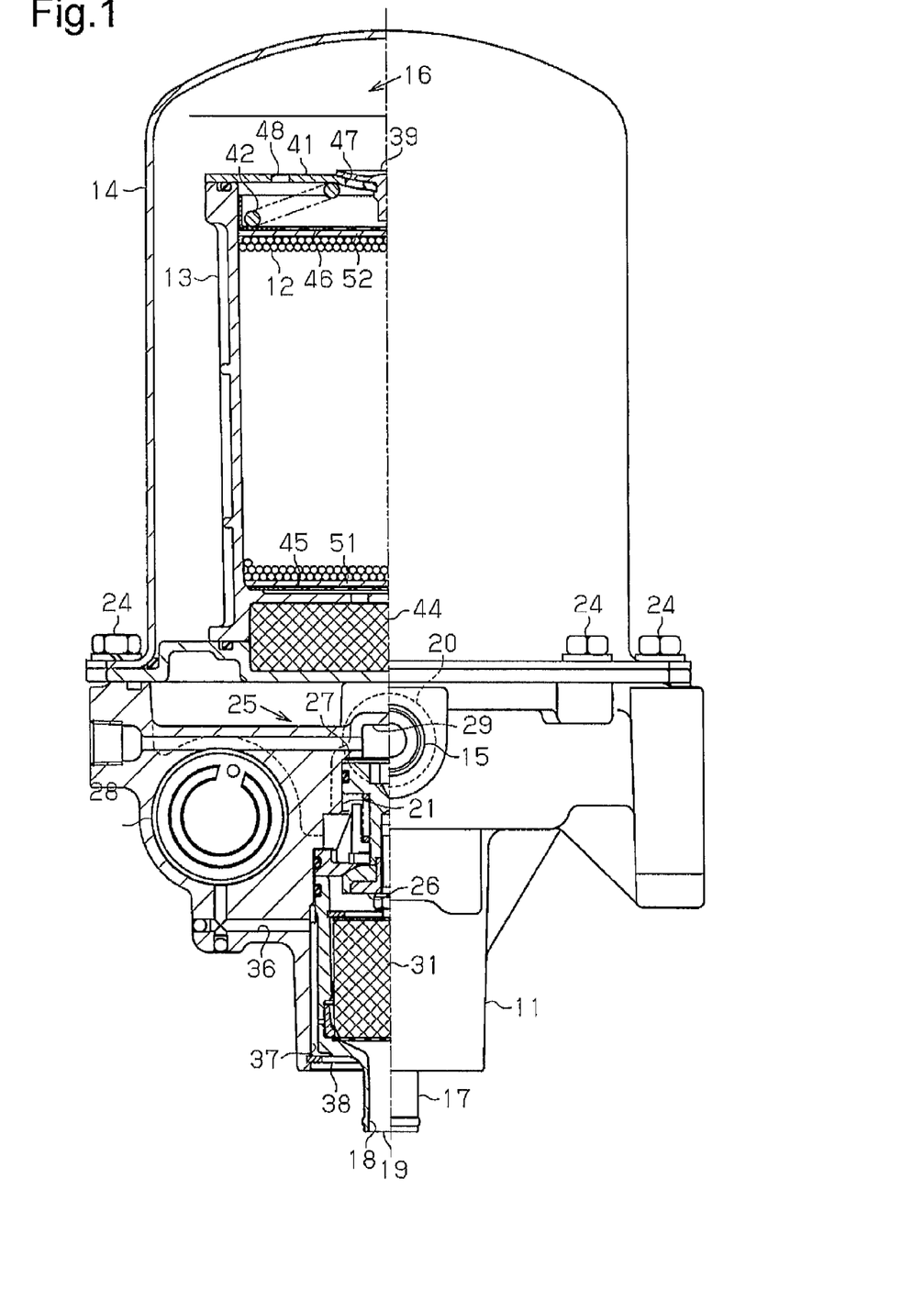
FIG. 1 is a half cross-sectional view schematically showing the structure of a compressed air drying device according to a first embodiment.
Figure 2:
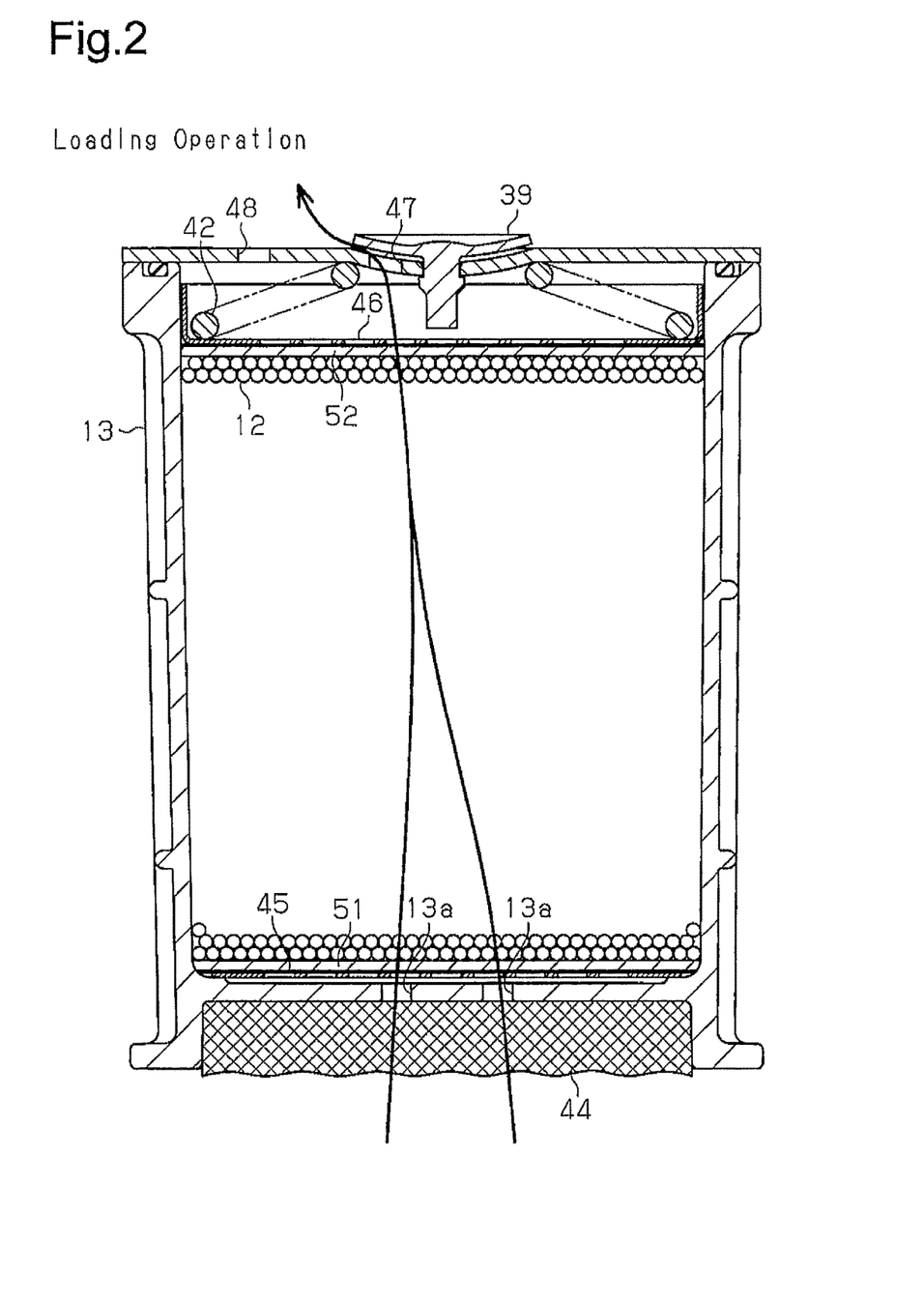
FIG. 2 is a cross-sectional view of a drying container received in the compressed air drying device of FIG. 1.

With reference to FIGS. 1 and 2, a compressed air drying device according to a first embodiment will now be described.

As shown in FIG. 1, the compressed air drying device includes a support base 11, a drying container 13, which has a cylindrical shape and a closed end, and a purge tank 14, which has a cylindrical shape and has an opening and a closed end. The purge tank 14 covers the drying container 13 and is coupled to the support base 11. The purge tank 14 is open toward the support base 11. The drying container 13 is filled with desiccant 12.

The support base 11 includes an inlet 15 and an outlet 20 on the side. The compressed air delivered by a compressor (not shown) is introduced through the inlet 15, and the dried compressed air (hereinafter, the dry compressed air) is discharged through the outlet 20 to an air tank (not shown), which is connected to the compressed air drying device. The inlet 15 is arranged on the front side of the support base 11, and the outlet 20 is arranged on the back side of the support base 11. The support base 11 includes a columnar housing 21, which is open downward. A draining device 25 is arranged at the upper part of the housing 21. A cylindrical exhaust pipe 17 is coupled to a part of the housing 21 below the draining device 25. A drain discharge port 19 as a discharge port, which is an outlet of the exhaust pipe 17, is open to the atmosphere.

The draining device 25 includes a piston 27 and a drain valve 26 for discharging collected liquid containing oil and water. The drain valve 26 also serves as a release valve, which discharges collected liquid to the atmospheric air during an unloading operation. The drain valve 26 is closed during a loading operation, in which water is removed from compressed air. When the pressure in the air tank reaches a predetermined value, air is supplied from a governor 28, which is arranged in the support base 11, to a control compartment 29, which is a space inside the support base 11. This lowers the piston 27 to open the drain valve 26. When the drain valve 26 is opened, the collected liquid is rapidly discharged with the compressed air to the exterior.

A filter 31 is arranged in the exhaust pipe 17. The filter 31 is formed of metal material having small air holes inside such as crushed aluminum and functions as a silencer that reduces noise occurring when collected liquid is discharged.

Governor exhaust port passages 37 are arranged in the support base 11 and cause the exhaust gas of the governor 28 to pass through a governor exhaust passage 36. The governor exhaust port passages 37 are spaces formed by the inner wall of the housing 21 and the outer wall of the exhaust pipe 17. The governor exhaust port 38, which is an opening of the governor exhaust port passages 37, is open to the atmospheric air.

The purge tank 14 covers the drying container 13 and is coupled to the upper end of the support base 11 with bolts 24. The space formed by the inner wall of the purge tank 14 and the outer wall of the drying container 13 functions as a tank 16, which retains the dry compressed air, from which water is removed.

The desiccant 12, with which a drying container 13 is filled, is held between a lower plate 45 and an upper plate 46 in the vertical direction. An oil separating filter 44, which serves as an impingement member, is arranged below the drying container 13. The oil separating filter 44 is formed of crushed aluminum. The flow of compressed air is finely altered inside the oil separating filter 44, and inertia causes the oil particles that flow with the compressed air to collide with the aluminum surface. Thus, the oil separating filter 44 captures the oil particle.

As shown in FIG. 2, the lower plate 45 and the upper plate 46 include through holes. A first glass fiber filter 51 is arranged on the upper surface of the lower plate 45. A second glass fiber filter 52 for holding the desiccant 12 is arranged on the lower surface of the upper plate 46. The glass fiber filters 51 and 52 are formed by shaping glass fiber into a substantially disc shape. The diameters of the glass fiber filters 51 and 52 are approximately the same as the inner diameter of the drying container 13. The glass fiber filters 51 and 52 hold the desiccant 12 and have a function for removing oil from compressed air. In the present embodiment, the glass fiber filters 51 and 52 are the same in thickness. In addition, the glass fiber filters 51 and 52 have fiber diameters, hole diameters, and depth direction densities with which it is possible to capture fine oil particles in the Brownian motion in the compressed air.

In other words, collision with the oil separating filter 44 is the most efficient to capture oil particles having relatively large particle diameters, which are, e.g., larger than or equal to 1 μm, although it depends on the flow speed of the compressed air. However, the compressed air contains more fine oil particles than oil particles that are large in diameter. The fine oil particles are in irregular movement (Brownian motion) by colliding with the gaseous molecules of the compressed air, which has no relation to the flow of the compressed air. The particle diameters of the oil particles in the irregular movement are, e.g., less than or equal to 50 nm. Such fine oil particles are difficult to capture by a method using inertia collision, and it is efficient to capture the oil particles by contacting the fiber of the glass fiber filters 51 and 52. The oil separating filter 44 and the glass fiber filters 51 and 52 can also capture middle-sized oil particles such as ones having particle diameters between 50 nm and 1 μm although its efficiency decreases a little bit.

A coil spring 42 is arranged between the upper plate 46 and a lid member 41. The coil spring 42 presses the upper plate 46 downward with urging force that occurs by fixing the lid member 41 to the drying container 13. Thus, the glass fiber filters 51 and 52, the desiccant 12, and the oil separating filter 44 are urged by the coil spring 42.

The lid member 41 includes a first through hole 47 and a second through hole 48. The first through hole 47 includes a check valve 39, which allows only air flow from the interior to the exterior of the drying container 13.

With reference to FIGS. 1 and 2, operation of the compressed air drying device configured as above will now be described.

With reference to FIG. 1, operation during the loading operation will now be described. The compressed air delivered from the compressor through the inlet 15 enters the drying container 13 and passes through the oil separating filter 44. Here, most of the dust and oil particles that are relatively large in diameter, which have been contained in the compressed air, are removed from the compressed air.

As shown in FIG. 2, the compressed air that has passed through the oil separating filter 44 passes through the holes 13a, which are formed at the bottom of the drying container 13, and the through holes of the lower plate 45 and passes through the first glass fiber filter 51. Most of the oil particles that are relatively small in diameter are removed from the compressed air by passing through the first glass fiber filter 51. In this way, when the compressed air, in which the oil content by percentage is reduced, passes through the desiccant 12, water is removed from the compressed air. At this time, since oil has been captured by the oil separating filter 44 and the glass fiber filter 51 before passing through the desiccant 12, clogging of the desiccant 12 is limited.

The compressed air that has been dried by passing through the desiccant 12 passes through the second glass fiber filter 52, the through holes of the upper plate 46, and the first through hole 47 formed in the lid member 41 and is temporarily retained in the tank 16 inside the purge tank 14. Some of the dry compressed air that has been brought to the tank 16 remains in the tank 16, and the remainder passes through the outlet 20 and is retained in an external air tank. The compressed air in the air tank is utilized for, e.g., operation of devices in the air braking system.

Operation during the unloading operation will now be described.

As shown in FIG. 1, the compressed air drying device shifts to the unloading operation for regenerating the desiccant by operation of the governor 28 at the timing when the pressure of the air tank reaches the upper limit. As the pressure in the air tank reaches a predetermined value, the governor 28 supplies air to the control compartment 29, which drives the drain valve 26. This moves the piston 27 to open the drain valve 26. When the drain valve 26 of the draining device 25 is opened, the dry compressed air that is retained in the purge tank 14 flows from the upper portion to the lower portion in the drying container 13, and oil and water is discharged with the compressed air from the drain discharge port 19 of a drain discharging passage 18. In other words, the dry compressed air retained in the tank 16 passes through the through holes of the upper plate 46 and the second glass fiber filter 52 via the second through hole 48 of the lid member 41 and is introduced to the drying container 13. At this time, at least some of the oil captured by the second glass fiber filter 52 is also removed from the dry compressed air. The dry compressed air regenerates the desiccant 12 by contacting the desiccant 12. The compressed air that has passed through the desiccant 12 and contained water and the like passes through the first glass fiber filter 51 and the through holes of the lower plate 45 and passes through the oil separating filter 44. At this time, least some of the oil captured by the first glass fiber filter 51 is removed from the compressed air. The compressed air passes through the draining device 25, passes through the filter 31 of the exhaust pipe 17, and is discharged with collected liquid to the exterior.

As described above, the present embodiment achieves the following advantages.

(1) In the air flow during the loading operation, the first glass fiber filter 51 is arranged upstream of the desiccant 12 and the second glass fiber filter 52 is arranged downstream of the desiccant 12. Thus, the glass fiber filters 51 and 52 can capture oil particles that are small in particle diameter in the compressed air. This increases the removal rate of oil from the compressed air, while the desiccant 12 removes water from the compressed air. Each of the glass fiber filters 51 and 52 holds the desiccant 12. Thus, a filter capable of capturing oil is provided, without reserving a space for providing another filter in the flow path of the compressed air.

(2) In the air flow during the loading operation, the glass fiber filters 51 and 52 are arranged downstream of the oil separating filter 44. Thus, the oil separating filter 44 can capture oil particles that are relatively large in diameter in advance. In addition, the compressed air in which most of the oil particles that are large in particle diameter has been removed flows through the glass fiber filters 51 and 52. Thus, the amount of oil captured by the glass fiber filters does not exceed the capacity of the filters in a short time.

Second Embodiment

Figure 3:
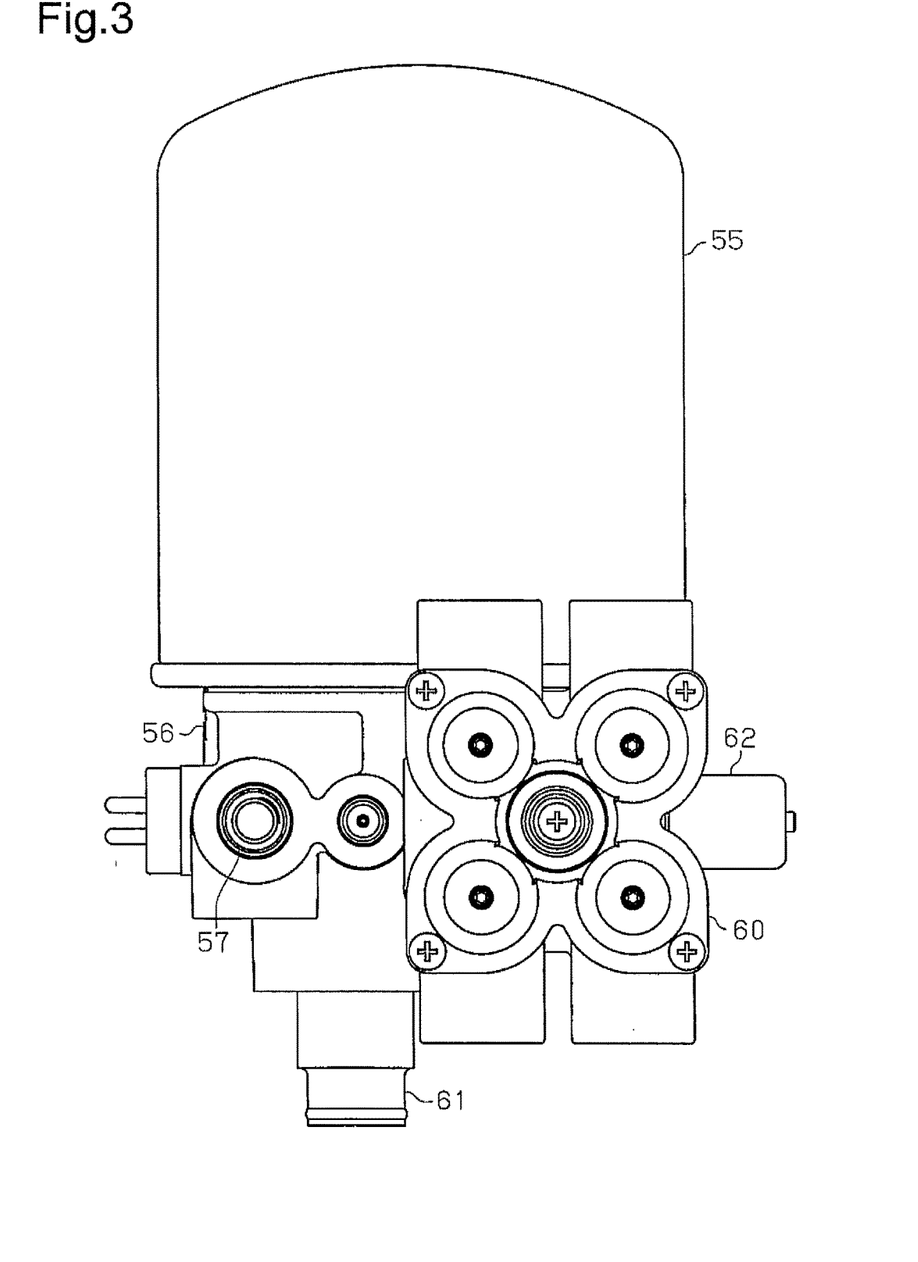
FIG. 3 is a front view of a compressed air drying device according to a second embodiment.
Figure 4:
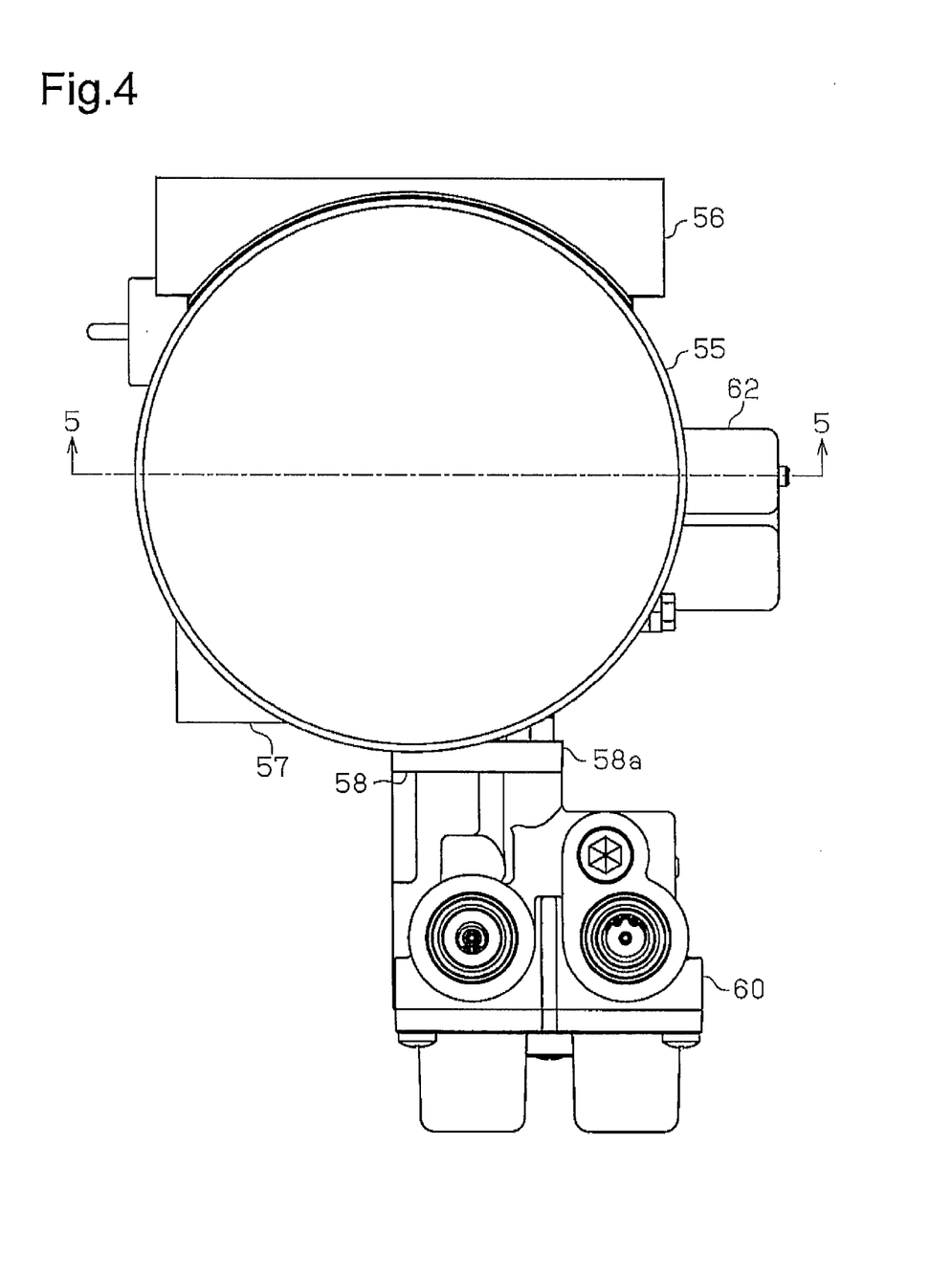
FIG. 4 is a plan view of the compressed air drying device of FIG. 3.
Figure 5:
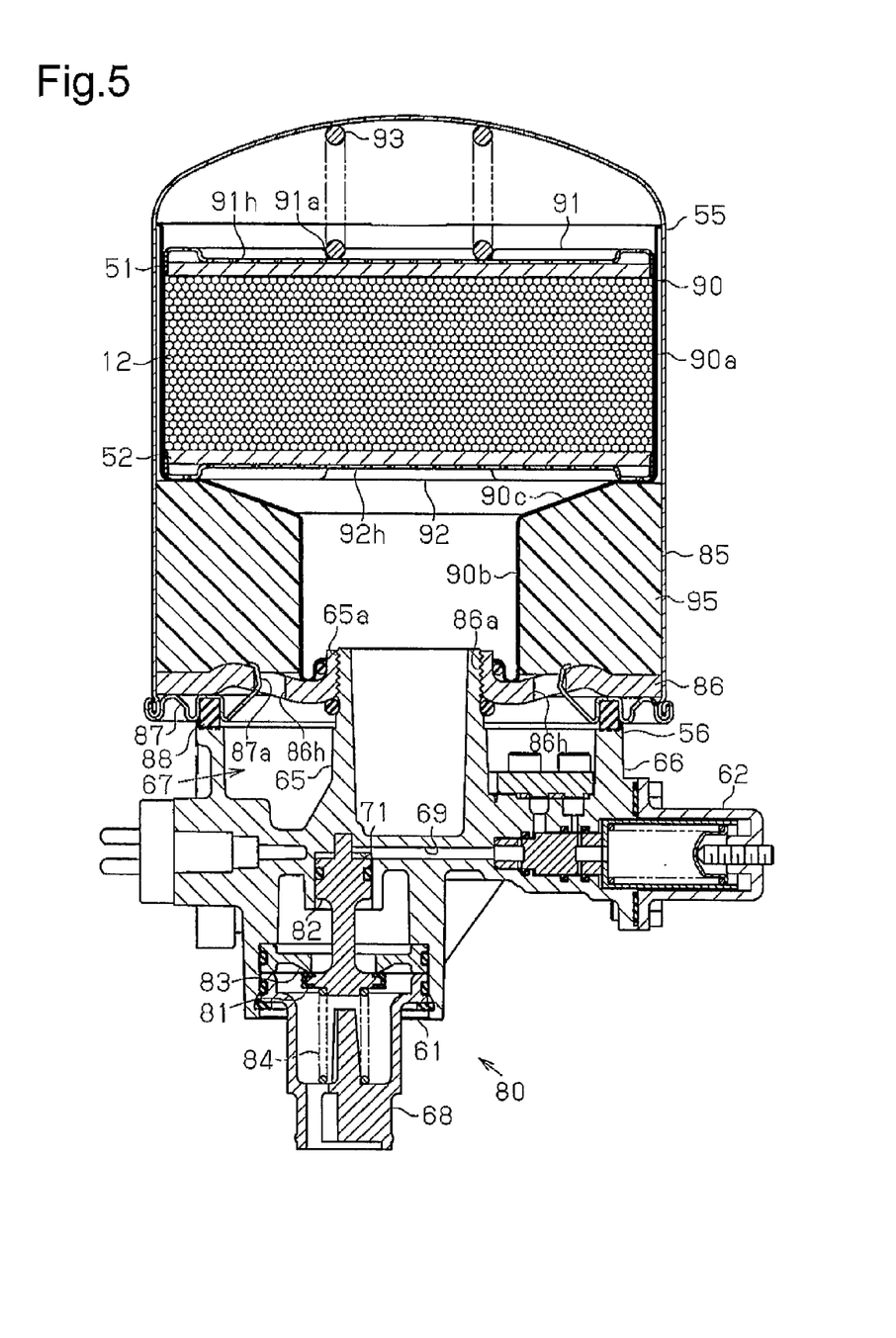
FIG. 5 is a cross-sectional view of the compressed air drying device of FIG. 3.

With reference to FIGS. 3 to 5, a compressed air drying device according to a second embodiment will now be described mainly in differences from the first embodiment.

The compressed air drying device according to the second embodiment is different from the first embodiment in the point that a purge tank including a drying container is of a cartridge type and replaceable. In the drawings, like reference numerals designate like or corresponding parts of the first embodiment and the parts will not be described in detail.

As shown in FIG. 3, the compressed air drying device includes a cylindrical exterior case 55 having a closed end and a support base 56, which supports the exterior case 55. The exterior case 55 is detachable from the support base 56.

As shown in FIG. 4, the support base 56 includes, on the side, an inlet 57 and an outlet 58, which are directed in the same direction. The compressed air supplied from a compressor (not shown) is introduced through the inlet 57. The dry compressed air is supplied through the outlet 58 to an air tank (not shown). A check valve (not shown) is arranged in the outlet 58. The check valve opens the outlet 58 during a loading operation and closes the outlet 58 during an unloading operation. The outlet 58 includes a flange 58a to which a protection valve 60 is coupled.

The protection valve 60 integrally includes pressure protection valves, each of which corresponds to an air tank (a brake circuit), which is not illustrated. Thus, systems including the air tanks are independent from one another. When the pressure of compressed air decreases in any one of the air tanks (a defect), the protection valve 60 closes the pressure protection valve (illustration abbreviated) corresponding to the air tank and protects the other non-defective air tanks (brake circuits).

As shown in FIG. 3, the support base 56 includes a pressure governor 62. The central part of the bottom portion of the support base 56 includes a drain discharge port 61. The drain discharge port 61 serves as a discharge port through which collected liquid is discharged during the unloading operation.

As shown in FIG. 5, the central part of the upper portion of the support base 56 includes an inner cylindrical portion 65, which has a cylindrical shape. An external thread 65a is formed in the outer periphery of the upper portion of the inner cylindrical portion 65. The outer peripheral part of an upper portion of the support base 56 includes an outer cylindrical portion 66, which has a cylindrical shape. The space between the inner cylindrical portion 65 and the outer cylindrical portion 66 functions as a first tank 67, which retains compressed air that is introduced through the inlet 57. A drain valve device 80, which opens and closes the drain discharge port 61, is arranged in the drain discharge port 61. An exhaust pipe 68 is coupled to and exposed from the drain discharge port 61. A central portion of the support base 56 includes a space 71. The pressure governor 62 is capable of supplying compressed air to the space 71 through a communication line 69.

The drain valve device 80 includes a valve member 81 for opening and closing the drain discharge port 61 and a piston 82 for moving the valve member 81. The valve member 81 is adapted to move integrally with the piston 82 and to be received by a valve seat 83 of the drain valve device 80. The piston 82 is adapted to close the space 71, which is formed in the support base 56, and urged upward by an urging spring 84. When compressed air is supplied to the space 71 from the pressure governor 62, the piston 82 is depressed. As the valve member 81 is depressed together with the piston 82, the valve member 81 is separated from the valve seat 83, thus opening the drain discharge port 61. In contrast, as air is discharged from the space 71, the piston 82 is pressed upward by the urging spring 84. The valve member 81 is pressed upward together with the piston 82 and received by the valve seat 83, thus closing the drain discharge port 61.

The drain valve device 80 closes the drain discharge port 61 during the loading operation. When the pressure in the air tank increases to the predetermined maximum value, the compressed air is supplied to the space 71 from the pressure governor 62. Thus, the drain valve device 80 opens the drain discharge port 61. As a result, the collected liquid that contains oil and water is rapidly discharged to the exterior through the opened drain discharge port 61 by the compressed air (purge air) introduced from the exterior of the compressed air drying device. Discharge of the compressed air through the drain discharge port 61 decreases the pressure in the exterior case 55. When the pressure in exterior case 55 reaches the predetermined minimum pressure, supply of compressed air to the space 71 is stopped, and the piston 82 is no longer pressed downward. Thus, the drain discharge port 61 is closed by the urging force of the urging spring 84.

The exterior case 55 includes an outer case 85 having a cylindrical shape with a closed end, a coupling plate 86, and a fixing member 87. The outer case 85 has an open end facing the support base 56. The coupling plate 86 closes the opening of the outer case 85 and is installed in the support base 56. The fixing member 87 fixes the coupling plate 86 to the outer case 85. The interior of the outer case 85 receives a drying container 90, which has a cylindrical shape and is filled with the desiccant 12. The drying container 90 includes a large diameter portion 90a and a small diameter portion 90b. The outer diameter of the large diameter portion 90a is approximately equal to the inner diameter of the outer case 85. The outer diameter of the small diameter portion 90b is approximately half the inner diameter of the outer case 85. The large diameter portion 90a and the small diameter portion 90b are connected by a connection portion 90c.

A central portion of the coupling plate 86 includes an internal thread 86a. The internal thread 86a is threated onto the external thread 65a of the inner cylindrical portion 65 in the support base 56. By threading the internal thread 86a of the coupling plate 86 onto the inner cylindrical portion 65, the exterior case 55 is installed in the support base 56. The coupling plate 86 is fixed to a fixing member 87 by arranging the outer peripheral portion of the fixing member 87 around the opening end of the outer case 85 and securing locking pieces 87a of the fixing member 87 to holes 86h of the coupling plate 86. A sealing member 88, which is held in tight contact with the upper end of the support base 56 to form a sealed space, is coupled to the lower portion of the fixing member 87.

The granular desiccant 12, with which the drying container 90 is filled, is held between the upper plate 91 and the lower plate 92 via the first glass fiber filter 51 and the second glass fiber filter 52 in the vertical direction. An urging spring 93 is arranged in the outer case 85. The urging spring 93 is arranged on a spring receiving portion 91a of the upper plate 91 and urges the upper plate 91 toward the lower plate 92. The upper plate 91 includes through holes 91h, and the lower plate 92 includes through holes 92h. The upper plate 91 includes grooves that radially extend from the spring receiving portion 91a. The glass fiber filters 51 and 52 are shaped the same as the first embodiment.

The interior space of the outer case 85 receives an oil adsorbent material 95 below the lower plate 92. The oil adsorbent material 95 has a substantially annular shape and is arranged in a space formed between the inner wall surface of the outer case 85 and the connection portion 90c and the small diameter portion 90b of the drying container 90. The oil adsorbent material 95 is formed of a sponge having oil resistance, heat resistance, and water resistance. The oil adsorbent material 95 captures oil particles that are relatively large in diameter by electrostatic force. The oil adsorbent material 95 is suitable for capturing oil particles having particle diameters of 300 nm to 1 μm.

With reference to FIG. 5, operation of the compressed air drying device will be described.

The loading operation is started when the pressure in the exterior case 55 becomes a predetermined minimum value and ended when the pressure of the air tank becomes a predetermined maximum value. During the loading operation, the inlet 57 (see FIG. 3) and the outlet 58 (see FIG. 4) are opened, and the drain discharge port 61 is closed. The unloading operation is started when the pressure in the air tank becomes a predetermined maximum value and ended when the pressure in the exterior case 55 becomes a predetermined minimum value. During the unloading operation, the inlet 57 and the outlet 58 are closed, and the drain discharge port 61 is opened.

During the loading operation, compressed air introduced by a compressor (not shown) through the inlet 57 is brought to a first tank 67. The compressed air is introduced to the oil adsorbent material 95 through the holes 86h formed in the coupling plate 86. The oil adsorbent material 95 captures oil particles that are relatively large in diameter and contained in the compressed air by electrostatic force occurring between the oil particles and the oil adsorbent material 95.

The compressed air that has passed through the oil adsorbent material 95 passes through the gap between the exterior case 55 and the large diameter portion 90a and is introduced to the first glass fiber filter 51 through the through holes 91h of the upper plate 91. The glass fiber filter 51 captures fine oil particles in the Brownian motion. The compressed air from which most of the oil particles are removed is delivered to the desiccant 12. The compressed air from which water is removed by contacting the desiccant 12 is delivered to the small diameter portion 90b of the drying container 90 and discharged from the outlet 58.

The unloading operation will now be described. During the unloading operation, in a similar manner to the first embodiment, the inlet 57 and the outlet 58 are closed, and the drain discharge port 61 is opened. When the drain discharge port 61 is opened, collected liquid containing oil and water is rapidly released to the exterior by the dry compressed air in the outer case 85.

In other words, the dry compressed air retained in the outer case 85 passes through the second glass fiber filter 52 via the through holes 92h of the lower plate 92 and is delivered to the desiccant 12. The dry compressed air contacts the desiccant 12 to regenerate the desiccant 12. The compressed air that has passed through the desiccant 12 passes through the first glass fiber filter 51 and the through holes 91h of the upper plate 91 and passes through the oil adsorbent material 95 via a gap between the exterior case 55 and the large diameter portion 90a. At this time, not only water of the desiccant 12 but also some of the oil captured by the second glass fiber filter 52, the first glass fiber filter 51, and the oil adsorbent material 95 is removed from the compressed air.

The compressed air that has passed thorough the oil adsorbent material 95 passes through the interior of the drain valve device 80 via the first tank 67, passes through the exhaust pipe 68, and is discharged to the exterior together with collected liquid.

When the compressed air and the collected liquid are discharged from the drain discharge port 61 and the pressure in the exterior case 55 becomes close to the atmospheric pressure, discharge of the compressed air and the collected liquid is stopped. When the pressure in the exterior case 55 reaches a predetermined minimum pressure, supply of compressed air from the pressure governor 62 is stopped, so that air is discharged from the space 71, and the drain valve device 80 closes the drain discharge port 61 by the urging force of the urging spring 84. The compressed air drying device shifts from the unloading operation to the loading operation.

As described above, the present embodiment achieves the following advantage in addition to the advantage (1).

(3) The glass fiber filters 51 and 52 are arranged downstream of the oil adsorbent material 95 in the air flow during the loading operation. Thus, oil particles that are relatively large in diameter are captured in advance by electrostatic force occurring on the oil adsorbent material 95. In addition, the compressed air from which most of the oil particles that are large in diameter have been removed flows in the glass fiber filters 51 and 52. The amount of oil captured by the glass fiber filters 51 and 52 does not exceed the filter capacities in short time.

Third Embodiment

Figure 6:
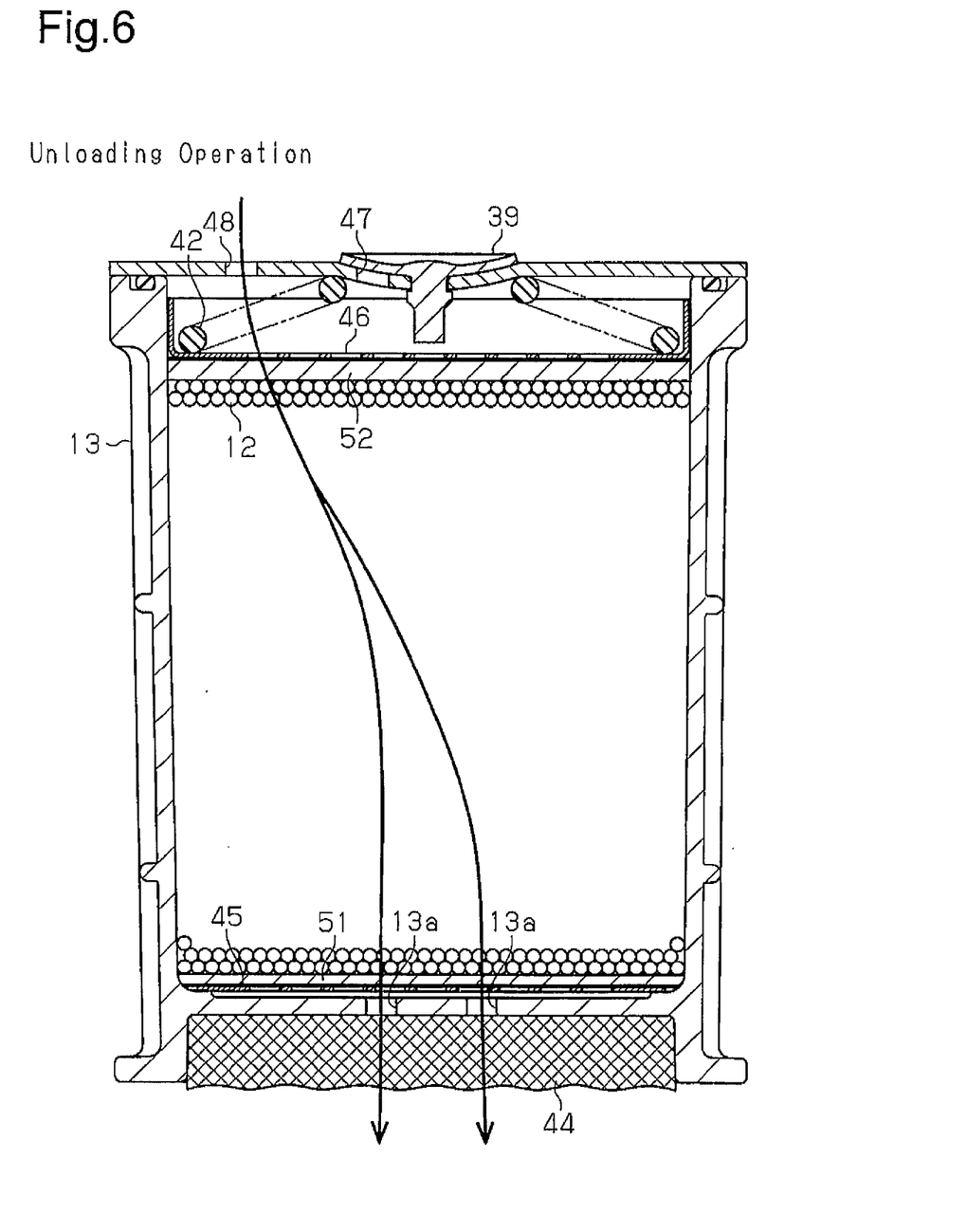
FIG. 6 is a cross-sectional view of a drying container arranged in a compressed air drying device according to a third embodiment.

With reference to FIG. 6, a compressed air drying device according to a third embodiment will now be described mainly in differences from the first embodiment. The compressed air drying device according to the third embodiment is different from the first embodiment in the structure of the glass fiber filter. In the drawings, like reference numerals designate like or corresponding parts of the first embodiment and the parts will not be described in detail.

As shown in FIG. 6, the first glass fiber filter 51 according to the present embodiment is formed of the same material as the second glass fiber filter 52 but is thinner than the second glass fiber filter 52. In the present embodiment, the first glass fiber filter 51 includes one sheet of filter, and the second glass fiber filter 52 is formed by laminating two or three sheets of filter, each of which is the same filter as the first glass fiber filter 51. Thus, even if the first glass fiber filter 51 absorbs water, the first glass fiber filter 51 easily discharges the water.

During the unloading operation, the second glass fiber filter 52 is not exposed to water discharged from the desiccant 12. In contrast, the first glass fiber filter 51 is exposed to water discharged from the desiccant 12 but it is easy for the first glass fiber filter 51 to discharge water since the first glass fiber filter 51 is thin. For this reason, the oil removing efficiency is not easily decreased. Thus, even after the loading operation is restarted, oil can be captured by the first glass fiber filter 51.

As described above, the present embodiment achieves the following advantage in addition to the advantages (1) and (2).

(4) The water that has been discharged from the desiccant with compressed air during the unloading operation is absorbed by the first glass fiber filter 51 when passing through an upstream glass fiber filter, i.e., the first glass fiber filter 51, during the loading operation. In this case, water is easily discharged since the thickness of the glass fiber filter 51, which is located upstream during the loading operation, is thinner than the glass fiber filter that is located downstream during the loading operation, i.e., the second glass fiber filter 52. This limits a decrease in the oil capturing efficiency of the glass fiber filter 51, which occurs by repeating the unloading operation.

Other Embodiments

The above-illustrated embodiments are carried out in the following forms.

Figure 7:
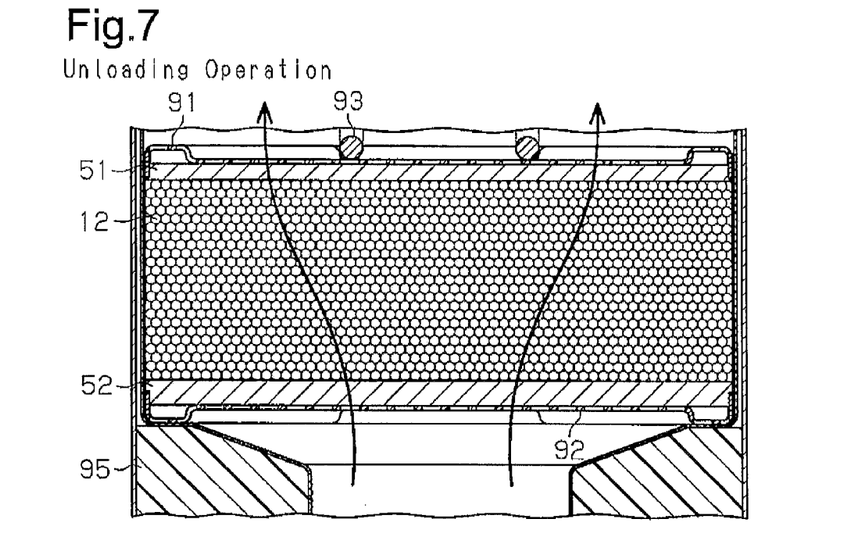
FIG. 7 is a cross-sectional view of a drying container arranged in a compressed air drying device of a modification.

As shown in FIG. 7, in the compressed air drying device including the cartridge type exterior case 55 according to the second embodiment, the glass fiber filters 51 and 52, which are arranged inside the exterior case 55, may be different in thickness. In this case, in a similar manner to the third embodiment, the thickness of the first glass fiber filter 51, which is located upstream of the desiccant 12 in the air flow during the loading operation, is set to be less than the thickness of the second glass fiber filter 52. This increases the discharging efficiency of water in the first glass fiber filter 51. Thus, even if being exposed to water discharged from the desiccant 12 during the unloading operation, the first glass fiber filter 51 easily discharges the water.

Figure 8:
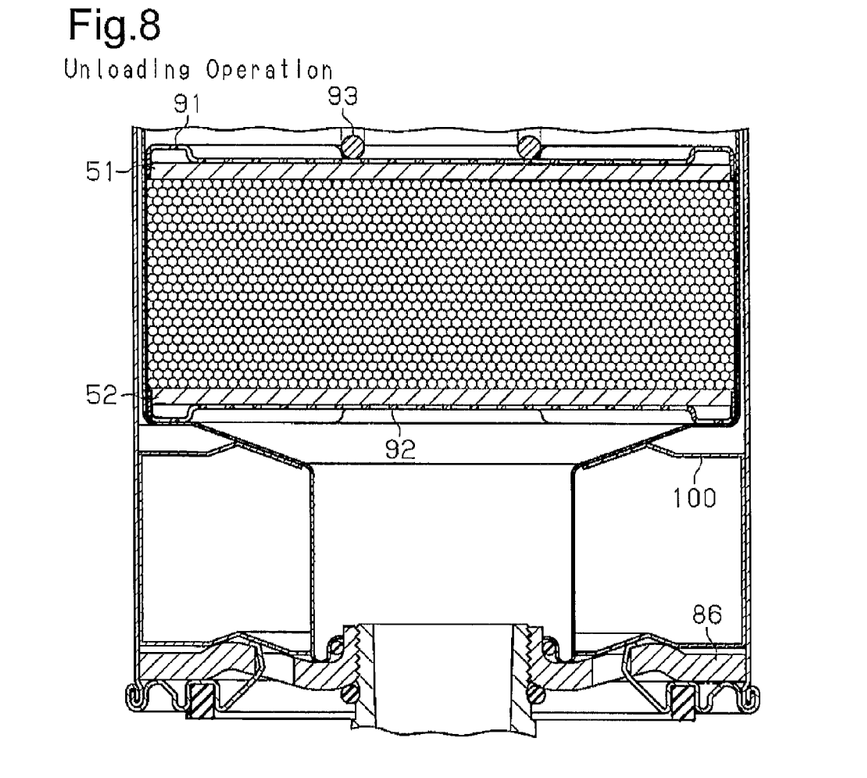
FIG. 8 is a cross-sectional view of a drying container arranged in a compressed air drying device of a modification.

As shown in FIG. 8, the oil adsorbent material 95 according to the second embodiment may include a baffle plate 100 instead of a sponge with electrostatic property. When the compressed air strikes the baffle plate 100, oil particles contained in the compressed air collide with the baffle plate 100 and are captured by the baffle plate 100.

Figure 9:
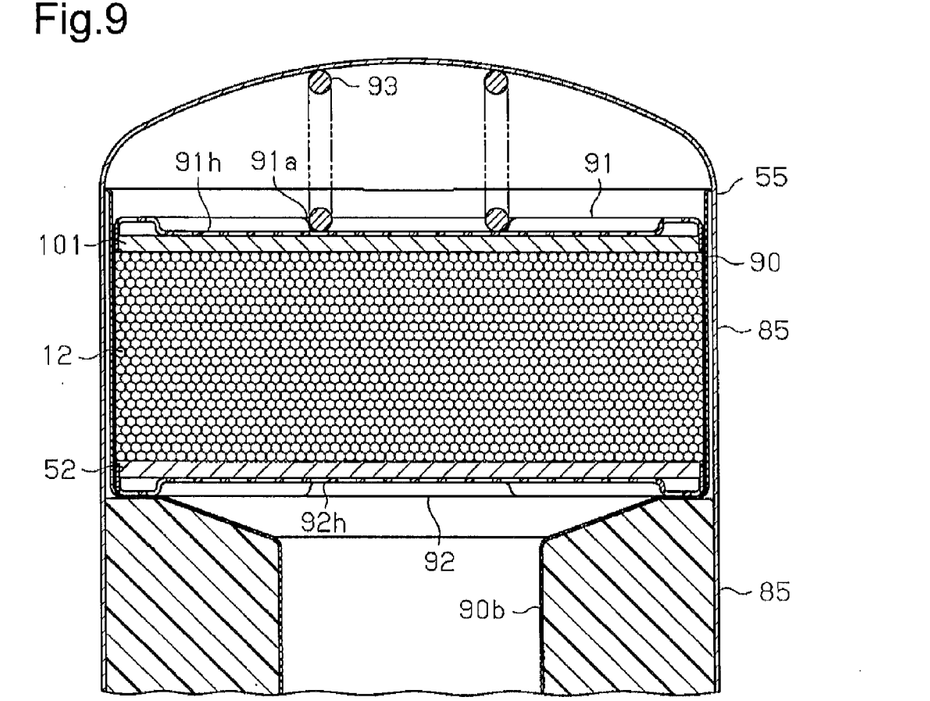
FIG. 9 is a cross-sectional view of a drying container arranged in a compressed air drying device of a modification.

As shown in FIG. 9, of the glass fiber filters 51 and 52, the first glass fiber filter 51, which is located upstream of the desiccant 12 in the air flow during the loading operation, may be exchanged to anther filter 101 that discharges water more efficiently than the glass fiber filter. For example, a filter formed of plastic fiber and the like, which has a lower water absorption rate than the glass fiber filter, may be employed.

In the above-illustrated embodiments, the first glass fiber filter 51 and the second glass fiber filter 52 are formed of the same material. However, the first glass fiber filter 51 may be different from the second glass fiber filter 52 in the fiber diameter, the hole diameter, and the depth direction density. For example, as the fiber diameter and the hole diameter increase, water is more efficiently discharged.

In the third embodiment, the first glass fiber filter is single-layered, and the second glass fiber filter 52 is formed by laminating two or three sheets of filter, each of which is the same as the single-layered glass fiber filter. The number of laminated sheets in the second glass fiber filter 52 may be number greater than one. The first glass fiber filter 51 may be formed by laminating two or more sheets of filter, and the number of laminated sheets in the second glass fiber filter 52 is set to be more than the number of laminated sheets in the first glass fiber filter 51.

At least one of the first glass fiber filter 51 and the second glass fiber filter 52 may be formed by laminating filters formed of material other than glass fiber, e.g., such as a sponge and nonwoven fabric, so that the filters arranged upstream and downstream of the desiccant 12 become a layered structure.

The glass fiber filters 51 and 52 have disc shapes. However, as long as the filters have shapes with which the filters can be arranged in a part of the flow path of compressed air and the compressed air can pass through the filters, other shapes may be employed. For example, a shape of which the center portion and the outer periphery portion are different in thickness may be employed.

The glass fiber filters 51 and 52 are formed by shaping glass fiber. However, a filter formed of glass fiber and other material may be employed. For example, such a filter includes a filter in which a base member supports glass fiber and a filter in which other material and glass fiber are mixed.

Figure 10:
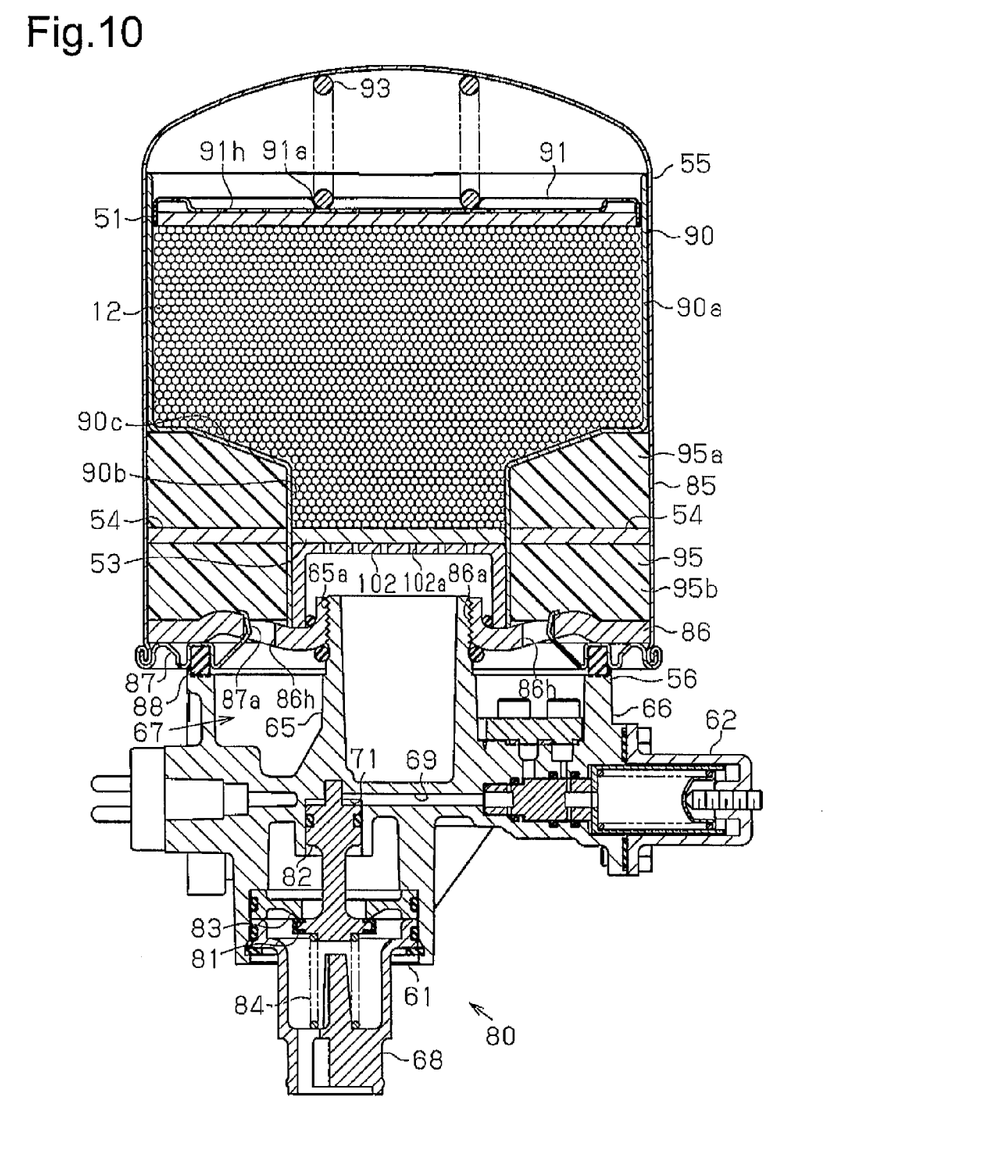
FIG. 10 is a half cross-sectional view schematically showing the structure of a compressed air drying device of a modification.

The position of the glass fiber filters may be changed as necessary. As shown in FIG. 10, the glass fiber filter 54 may be arranged between oil adsorbent materials 95a and 95b. In FIG. 10, the layered structure including the oil adsorbent material 95 and the glass fiber filter 54 has a three-layer structure. However, the layered structure may have three or more layers. When the glass fiber filter 53 is arranged downstream of the desiccant 12 and the glass fiber filter 54 is arranged in the oil adsorbent material 95 as above, the glass fiber filter 51, which is located upstream of the desiccant 12, may be formed of nonwoven fabric. Furthermore, when the small diameter portion 90b of the drying container 90 is filled with the desiccant 12, the glass fiber filter 54 may be arranged between the desiccant 12 and a cover member 102 that supports the desiccant 12. The cover member 102 has a tubular shape with a closed end, and has air holes 102a at least on a side wall on the side closer to the glass fiber filter 54. The dry compressed air that has passed through the glass fiber filter 54 via the air holes 102a passes to the side closer to the support base 56. The entire small diameter portion 90b of the drying container 90 may receive the glass fiber filter. The glass fiber filter has approximately the same diameter as the inner diameter of the small diameter portion 90b and has an annular shape.

In the above-illustrated embodiment, the oil adsorbent material 95 and the glass fiber filters 51 and 52 are arranged as filters for capturing oil particle. However, the entire space in which the oil adsorbent material 95 is arranged may receive glass fiber filters, and all the filters for capturing oil particles may be formed of glass fiber filters.

The structure of the compressed drying device may include a structure other than the above-illustrated embodiment as long as glass fiber filters can be installed upstream and downstream of the desiccant in the flow path of the compressed air.

DESCRIPTION OF REFERENCE NUMERALS

15, 57 . . . inlet, 20, 58 . . . outlet, 25, 80 . . . drain valve device, 19, 61 . . . drain discharge port, 11, 56 . . . support base, 12 . . . desiccant, 13, 90 . . . drying container, separating filter as an impingement member, 51, 52 . . . glass fiber filter, 95 . . . oil adsorbent, 100 . . . baffle plate as an impingement member, 101 . . . filter.

The invention claimed is:
1. A compressed air drying device comprising:
a support base including an inlet of compressed air from a compressor, an outlet of the compressed air, and a discharge port of oil and water, the discharge port including a drain valve device;
a drying container, which is filled with a desiccant and is installed in the support base;
a case that covers the drying container and is coupled to the support base; and
an oil separating member accommodated between the drying container and the case,
wherein the drying container includes an upper filter and a lower filter, and wherein the desiccant is filled between the upper filter and the lower filter,
wherein the compressed air drying device is configured to:

in a loading operation, cause the desiccant to dry the compressed air introduced through the inlet and discharge the dried compressed air through the outlet, and, in an unloading operation, cause the compressed air to pass through the lower filter, the desiccant, and the upper filter in the drying container and the oil separating member to discharge oil and water collected by the lower filter, the desiccant, the upper filter, and the oil separating member from the discharge port, wherein at least one of the lower filter and the upper filter is a glass fiber filter, wherein the oil separating member is configured to capture oil particles having a first range of particle diameters, and wherein the upper filter and the lower filter are configured to capture oil particles having a second range of particle diameters.

2. The compressed air drying device according to claim 1, wherein each of the upper filter and the lower filter is a glass fiber filter, and wherein the thickness of the glass fiber filter that is arranged upstream of the desiccant in the flow of the compressed air during the loading operation is less than the thickness of the glass fiber filter that is arranged downstream.

3. The compressed air drying device according to claim 1, wherein one of the upper filter and the lower filter that is arranged downstream of the desiccant in the flow of the compressed air during the loading operation is a glass fiber filter, and wherein the other of the upper filter and the lower filter that is arranged upstream of the desiccant has a water absorption rate lower than the glass fiber filter.

4. The compressed air drying device according to claim 1, wherein the case has a cylindrical shape, wherein the drying container includes a large diameter portion having an outer diameter that is approximately equal to an inner diameter of the case and a small diameter portion having an outer diameter that is less than the inner diameter of the case, and wherein the desiccant is filled in the large diameter portion.

5. The compressed air drying device according to claim 4, wherein the oil separating member is accommodated between the small diameter portion and the case.

6. The compressed air drying device according to claim 5, wherein a gap is formed between the large diameter portion and the case, and wherein, in the loading operation, the compressed air introduced from the inlet passes through the gap via the oil separating member, and enters the drying container.

7. The compressed air drying device according to claim 1, wherein the drying container includes an upper plate and a lower plate, wherein the upper filter is provided between the upper plate and the desiccant, and wherein the lower filter is provided between the lower plate and the desiccant.

8. The compressed air drying device according to claim 1, wherein the oil separating member is an impingement member, which removes oil from the compressed air by causing oil particles to collide with the impingement member.

9. The compressed air drying device according to claim 8, wherein the first range of particle diameters is greater than or equal to 1 and the second range of particle diameters is less than or equal to 50 nm.

10. The compressed air drying device according to claim 1, wherein the oil separating member is an oil adsorbent material, which captures oil particles by electrostatic force.

11. The compressed air drying device according to claim 10, wherein the first range of particle diameters is 300 nm to 1 μm, and wherein the second range of particle diameters is less than or equal to 50 nm.

* * * * *